May 19, 1970  E. H. MULDER  3,512,250
METHOD FOR MUTUALLY CONNECTING WORKPIECES AND
WORKPIECES MUTUALLY CONNECTED BY SAID METHOD
Filed May 10, 1967

Edo Hubert Mulder,
Inventor
By, Wenderoth, Lind & Ponack,
Attorneys

United States Patent Office 3,512,250
Patented May 19, 1970

3,512,250
METHOD FOR MUTUALLY CONNECTING WORKPIECES AND WORKPIECES MUTUALLY CONNECTED BY SAID METHOD
Edo Hubert Mulder, Hattem, Netherlands, assignor to Ingenieursbureau, Lemet Chromium H. van der Horst, N.V., Zwolle, Netherlands
Filed May 10, 1967, Ser. No. 637,445
Claims priority, application Netherlands, May 13, 1966, 6606592
Int. Cl. B23p 17/00
U.S. Cl. 29—527.4    4 Claims

ABSTRACT OF THE DISCLOSURE

A heating spiral is applied galvanically to the outside of a tube by providing a helical groove at the exterior of the tube and then rolling a spiral member in the helical groove. The spiral member is then galvanically embedded in the groove. The spiral member may be galvanically pre-treated.

---

For the purpose of more or less permanently connecting workpieces one to another the latter are welded or soldered together. As a rule the welding- or soldering-joint is taken no larger or broader than strictly necessary for obtaining a firm connection. Further it is known to provide workpieces with a coating layer e.g. for improving the workpiece or to impart certain properties to it which the workpiece as such is missing. Rendering conductible material which in itself is isolating is thought of here or, by applying an intermediate layer, rendering weldable or solderable sorts of material which do not allow to be mutually connected.

The object of the invention is, in applying the above mentioned, to obtain a method for connecting workpieces, said method comprising many possibilities of application.

According to the invention the workpieces are laid or put one on top of or against the other and they are joined by applying a coating which amalgamates or combines with both workpieces. In this case the coating has a double function. On the one side it serves for mutually connecting the workpieces and on the other hand for coating the workpieces and/or a workpiece composed of various parts, respectively.

In applying the invention tubular or bar-shaped material can be fixed to a carrier in that said material is attached to the carrier and thereafter a coating is galvanically or otherwise applied, such that the tube- or bar material is integrally embedded in said coating. In this way it is e.g. possible to provide heat-exchangers at their outsides with a heating spiral which on the one side assures a firm connection between the spiral and the carrier and on the other hand an excellent heat-contact between the spiral and the coating is formed. Another possibility of application of the invention is joining tube ends in which case the tube ends to be joined are put one against the other, a coating being applied around the joint which coating amalgamates with the tube ends. In this way, by applying an adhesive coating, tubes of totally different material which cannot be welded or soldered one to another, can be joined.

Figure 1:
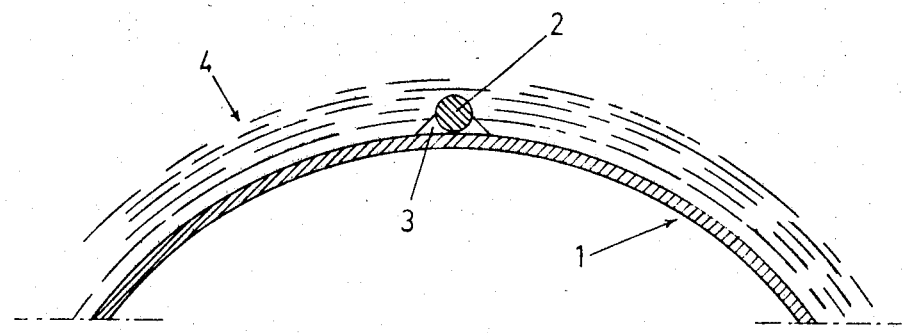
Figure 2:
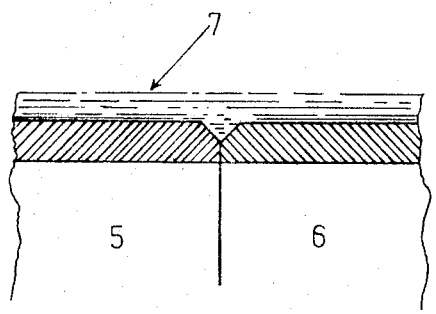

The invention will now be further described with reference to the accompanying drawing, in which:

FIG. 1 shows schematically the application of tube- or bar material to a carrier and FIG. 2 schematically the mutual connection of two tube ends.

In FIG. 1, 1 represents a workpiece in the shape of a tube member 1 to which in applying the invention another workpiece 2 in the shape of a bar or tube is fixed. Now, according to the invention, a layer or coating 4 is applied to the carrying portion 1, within which layer the tubular or bar shaped workpiece 2 is embedded, as appears from FIG. 1. The outside may be finished then e.g. by polishing it up to the size of the arrow as shown and so a smooth cylinder may be obtained which can be used for various purposes. Also thermo-heads may be introduced in this way. Thinkable is e.g. that the carrier 1 consists of a material which as such possesses only little stiffness. By applying bars 2 and the coating 4 the necessary stiffening may as it were be imparted to the tube 1.

Further the case is imaginable that the bar shaped or tubular workpiece 2 does not or only difficultly adhere to the carrying workpiece 1, that, however, the coating 4 possesses the property of adhering to both workpieces.

A further possibility of application is that the workpiece 2 is a tube through which a heat-conveying medium can be directed. So a cylinder can be obtained which in a very efficient way may be heated or cooled at its outer casing.

The applying or application of the layer or coating 4 may be done e.g. galvanically in using or applying current. Another possibility is that metal in hot condition is sprayed, with the workpiece being rotated. In this way a steel cylinder 1 may be provided with a refinement layer 4 in the form of nickel or chromium, said cylinder to be polished or ground off afterwards. As a matter of fact such heated cylinders may be used in very different industries. In applying the layer 4 a not completely filled space 3 will usually be formed directly underneath the workpiece 1. This so-called shadow-effect may be avoided under circumstances, however, in general it need not bring about any practical difficulties.

FIG. 2 shows the case in which two tube ends 5 and 6, facing each other, are connected one to another in applying the invention. A layer 7 is applied around the tube which layer not only fills up the joint but also coats the tube ends 5 and 6. Afterwards this layer 7 may be ground off to a desired size as indicated by an arrow. Also here the layer 7 has a double function, namely the connecting function between the tube ends 5 and 6 and a coating or covering function e.g. when the layer 7 consists of chromium, nickel or such like material which has been applied in a galvanical way.

As already observed the layer 7 may also consist of metal being sprayed in hot or fluid condition.

In applying the method of the invention tube ends 5 and 6 of total different nature may be mutually connected, on the condition only that the layer 7 will adhere to the material of the tube 5 as well as to that of tube 6. In this case also, by applying a stiffening layer 7, a certain stiffness could be imparted to tubes which in themselves do not possess any. It should be clear, that also here the domain of application is practically unlimited. Just as in the embodiment of FIG. 1 a tube spiral which may serve for transporting e.g. a heat-conveying medium may be embedded in the layer 7. In such case a tube may be externally heated which may be advantageous when substances have to be transported through the tube which when heated will more readily flow.

In case a roller has to be electrically heated the outside of the roller body may be provided with a helical groove into which the heating cable is rolled such that the cable only just protrudes from outside the circumference. Thereafter the cable may be galvanically embedded in the way described before.

It is advisable to submit the roller body to a pre-treatment e.g. by nickeling it. After the heating cable having been rolled in, it can be embedded by nickeling, whereupon the roller should be smoothed off and polished. If desired the heating body also may be galvanically pre-treated which furthers the adherence.

What is claimed is:

1. A method of galvanically applying a heating spiral to the outside of a tube comprising providing a helical groove in the outside of a tube, then rolling a spiral bar material in said helical groove and then galvanically embedding said bar material in said groove.

2. A method as set forth in claim 1 wherein said bar material is galvanically pre-treated.

3. A method as set forth in claim 1 wherein said bar material is a tube.

4. A method as set forth in claim 1 wherein the coating galvanically applied is surface ground and polished.

References Cited

UNITED STATES PATENTS

| | | | |
|---|---|---|---|
| 172,956 | 2/1876 | Benton | 29—484 |
| 436,498 | 9/1890 | Hafner | 202—185.5 |
| 921,811 | 5/1909 | Deckebach | 202—185.6 |
| 2,365,670 | 12/1944 | Wallace | 29—157.3 |
| 2,608,529 | 8/1952 | Varian | 164—98 |
| 2,661,029 | 12/1953 | Walsh | 140—71.5 |
| 2,772,183 | 11/1956 | Talmey et al. | 117—50 |
| 2,835,630 | 5/1958 | Huddle et al. | 117—50 X |
| 3,129,502 | 4/1964 | Olson | 29—502 X |
| 3,274,679 | 9/1966 | Kennedy | 29—473.1 |
| 3,341,917 | 9/1967 | Shunzo Oyabu et al. | 29—527.4 X |

FOREIGN PATENTS 1,246,917   4/1961   France.

JOHN F. CAMPBELL, Primary Examiner

R. J. SHORE, Assistant Examiner

U.S. Cl. X.R.

29—474.4, 492; 117—50, 231